US012749321B2

(12) United States Patent
Lallemand et al.

(10) Patent No.: US 12,749,321 B2

(45) Date of Patent: Sep. 29, 2026

(54) METHOD AND SYSTEM FOR AVOIDING WILDLIFE ACCIDENTS

(71) Applicant: Bayerische Motoren Werke Aktiengesellschaft, Munich (DE)

(72) Inventors: Joe Lallemand, Puchheim (DE); Michel Lanz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 235 days.

(21) Appl. No.: 18/701,284

(22) PCT Filed: Sep. 5, 2022

(86) PCT No.: PCT/EP2022/074591

§ 371 (c)(1),
(2) Date: Apr. 15, 2024

(87) PCT Pub. No.: WO2023/066559

PCT Pub. Date: Apr. 27, 2023

(65) Prior Publication Data

US 2024/0428598 A1 Dec. 26, 2024

(30) Foreign Application Priority Data

Oct. 18, 2021 (DE) ..................... 10 2021 126 952.0

(51) Int. Cl.
*G06V 20/00* (2022.01)
*B60W 50/00* (2006.01)
(Continued)

(52) U.S. Cl.
CPC ......... *G06V 20/58* (2022.01); *B60W 50/0097* (2013.01); *B60W 50/14* (2013.01);
(Continued)

(58) Field of Classification Search
CPC ...... G06V 20/58; G06V 10/26; G06V 10/803; G06V 10/82; B60W 50/0097;
(Continued)

(56) References Cited

U.S. PATENT DOCUMENTS

2014/0072176 A1* 3/2014 Orecher ................ G06V 20/58 382/103
2016/0350930 A1* 12/2016 Lin ........................ G06V 20/70
(Continued)

FOREIGN PATENT DOCUMENTS

DE 102004050597 A1 * 4/2006 ............ B60Q 1/143
DE 10 2012 025 364 A1 7/2014
(Continued)

OTHER PUBLICATIONS

International Search Report (PCT/ISA/210) issued in PCT Application No. PCT/EP2022/074591 dated Dec. 16, 2022 with English translation (5 pages).

(Continued)

*Primary Examiner* — Xiao Liu

(74) *Attorney, Agent, or Firm* — Crowell & Moring LLP

(57) ABSTRACT

A computer-implemented method for determining a likelihood of occurrence of wildlife in a predetermined region in a main direction of travel of an automated motor vehicle is provided. The method includes receiving image data from a camera installed in and/or on the motor vehicle, and determining the likelihood of occurrence based on the received image data. The likelihood of occurrence based on the received image data is determined using an artificial intelligence system.

12 Claims, 2 Drawing Sheets

(51) Int. Cl.

| | |
|---|---|
| ***B60W 50/14*** | (2020.01) |
| ***B60W 60/00*** | (2020.01) |
| ***G06V 10/26*** | (2022.01) |
| ***G06V 10/80*** | (2022.01) |
| ***G06V 10/82*** | (2022.01) |
| ***G06V 20/58*** | (2022.01) |

(52) U.S. Cl.
CPC ........... *B60W 60/001* (2020.02); *G06V 10/26* (2022.01); *G06V 10/803* (2022.01); *G06V 10/82* (2022.01); *B60W 2050/143* (2013.01); *B60W 2050/146* (2013.01); *B60W 2420/403* (2013.01)

(58) Field of Classification Search
CPC ............... B60W 50/14; B60W 60/001; B60W 2050/143; B60W 2050/146; B60W 2420/403
See application file for complete search history.

(56) References Cited

U.S. PATENT DOCUMENTS

| | | | | |
|---|---|---|---|---|
| 2018/0373980 | A1 * | 12/2018 | Huval | ...................... G06N 3/08 |
| 2022/0002978 | A1 * | 1/2022 | Kurosawa | .............. G06V 10/82 |

FOREIGN PATENT DOCUMENTS

| | | | | | |
|---|---|---|---|---|---|
| DE | 10 2013 200 731 | A1 | | 7/2014 | |
| DE | 102014207399 | A1 | * | 10/2015 | ............... B60Q 3/80 |

OTHER PUBLICATIONS

German-language Written Opinion (PCT/ISA/237) issued in PCT Application No. PCT/EP2022/074591 dated Dec. 16, 2022 with English translation (12 pages).
German-language Search Report issued in German Application No. 10 2021 126 952.0 dated May 9, 2022 with partial English translation (11 pages).
"aCVC, a Computer Vision Company", Softwarepacket, Sep. 5, 2021, pp. 1-7, XP093002731 (7 pages).
He, K. et al., "Mask R-CNN", 2017 IEEE International Conference on Computer Vision (ICCV), Oct. 1, 2017, pp. 1-12, XP055745836 (12 pages).
"Ren, S. et al., ""Faster R-CNN: Towards Real-Time Object Detection with Region Proposal Networks", Jan. 6, 2016, pp. 1-14, XP055821951 (14 pages).
Acvc, a Computer Vision Company, "Mask R CNN on Lidar", Mar. 22, 2021, XP093002797 (2 pages).
Anonymous: "Class Names of MS-COCO Classes in Order of Detectron dict", Mar. 5, 2018, XP093002795 (2 pages).
Acvc, A Computer Vision Company: "PSPNet on Lidar", Mar. 22, 2021, XP093002796 (2 pages).

* cited by examiner

METHOD AND SYSTEM FOR AVOIDING WILDLIFE ACCIDENTS

BACKGROUND AND SUMMARY

The present invention relates to a computer-implemented method for determining a probability of occurrence of wildlife in a predetermined region in a main direction of travel of an automated motor vehicle, to a control apparatus which is configured to carry out the method, to an automated motor vehicle having the control apparatus, and to a computer program product and a computer-readable storage medium each comprising instructions which, when the program is executed by a control apparatus, cause the latter to carry out the method.

Driving assistance systems which are installed in motor vehicles and are used to avoid wildlife accidents, that is to say collisions of the motor vehicle with wild animals, are known from the prior art.

In this case, a distinction can be made between preventative systems, which calculate a probability of a wildlife accident on the basis of input data and attempt to avoid a wildlife accident independently of actually detected wildlife in the motor vehicle environment, and reactive systems which are intended to avoid a wildlife accident after the wildlife has been detected.

A system for managing accident risk situations involving living beings, in particular animals, is known from DE 10 2014 207 399 A1 as a reactive system. The system comprises at least one sensor which is configured to detect a living being in the region of the likely trajectory in the forward direction of a vehicle and/or to determine the direction of movement of the living being, at least one first device which is configured to classify the living being, wherein a distinction can be made between at least two species of living beings, at least one second device which is configured to determine a strategy for mitigating the effects of an accident or for avoiding an accident on the basis of the classification, and a first control device which is configured to initiate at least one measure for mitigating the effects of an accident or for avoiding an accident.

These reactive systems reach their limits, in particular in situations, such as on country roads, in which the motor vehicle is moving at a relatively high speed in unclear terrain. The wildlife can therefore sometimes be detected by means of a camera, for example, only when a braking distance based on a distance between the motor vehicle and the wildlife is already too long for avoiding a collision.

DE 10 2013 200 731 A1 discloses a preventative method for estimating a risk to the vehicle in a manner based on the situation. The method comprises receiving a location of the vehicle that is determined by the vehicle, receiving a current time that is determined by the vehicle, and searching a database for at least one entry relating to previous damage to a vehicle at the determined location and/or its environment. The database comprises entries each comprising information relating to the previous extent of damage to a vehicle as well as the location and the time at which the damage occurred. If searching the database leads to at least one entry, the method comprises estimating a value for a risk to the vehicle on the basis of the determined location and the determined time as well as the information relating to the extent of damage and the location and the time at which the damage occurred, which are each included in the at least one entry. The estimation can be carried out with the aid of statistical methods or methods based on probabilities. The method also comprises outputting an indication of the risk of the estimated value exceeds a threshold value.

One disadvantage of the method described in DE 10 2013 200 731 A1 is that it is only possible to cover situations which are stored as entries in the database. Otherwise, it is not possible to adequately assign the situation captured by means of sensor data to an entry stored in the database or is possible only with a possibly unsatisfactory result.

Against the background of this prior art, the object of the present invention is to specify an apparatus and a method which are each suitable for overcoming at least the above-mentioned disadvantages of the prior art.

DE 10 2004 050 597 A1 describes a method for warning of living objects, in particular wildlife, on a public highway, wherein results from sensor systems for detecting living objects and data from data output systems, which are relevant to assessing a probability of the occurrence of living objects on a public highway, are linked to one another in such a manner that a risk potential can be determined. The linking can be effected using a neural network.

The object is achieved by means of the features of the independent claim. The subclaims and coordinate claims contain preferred developments of the invention.

Accordingly, the object is achieved by means of a computer-implemented method for determining a probability of occurrence of wildlife in a predetermined region in a main direction of travel of an automated motor vehicle.

The main direction of travel may be, in particular, a current direction of travel of the motor vehicle if the latter is moving forward, that is to say exhibits a direction of movement substantially along a longitudinal direction of the motor vehicle from a rear to a front of the motor vehicle. The predetermined region is then in front of the front of the motor vehicle. The main direction of travel may also be defined on the basis of a trajectory, in particular a planned trajectory, of the motor vehicle, wherein the trajectory runs at least partially through the predetermined region.

The wildlife, the probability of occurrence of which in the predetermined region is determined according to the method, can also be referred to as game. The term “wildlife” is therefore set apart from that of the umbrella term “wild animal” which generally comprises all animals living in the wild. In particular, wildlife may be red deer, fallow deer and/or wild boar. In this case, it is conceivable for the wildlife to be interpreted differently by the method depending on regional differences. The method may thus have defined different animals as wildlife, for example for different regions, in particular for different countries. That is to say, a deer, for example, can be considered to be wildlife in Germany, whereas an elk does not play any role for the probability of occurrence of wildlife in Germany and is therefore not taken into account. In certain regions of Scandinavia, the assessment of the relevance of an elk may give a different result and this may be taken into account in the probability of occurrence of wildlife. It is therefore conceivable that various species of animals are taken into account when determining the probability of occurrence of wildlife for different countries or regions.

The probability of occurrence is a statistical probability that wildlife is in the predetermined region and/or will be in the region, in particular when the motor vehicle is in the predetermined region.

In the present case, computer-implemented means that all or at least one of the steps of the method is/are carried out by a computing apparatus. This computing apparatus may be in and/or on the motor vehicle, that is to say it is possible to carry out local calculations, and/or may be arranged outside the motor vehicle, that is to say it is additionally or alternatively possible to resort to the computing power of an external computing apparatus, for example a server.

The method comprises receiving image data from a camera installed in and/or on the motor vehicle, and determining the probability of occurrence on the basis of the received image data.

In other words, sensor data, more specifically image data or camera data, are received as input data for an algorithm which is configured to determine the probability of occurrence on the basis of these received image data.

In contrast to conventional methods, it is therefore proposed to use a camera not only to detect wildlife but also to both capture the surrounding area and classify the surrounding area for the purpose of determining a potential wildlife crossing by means of artificial intelligence.

In addition to the image data, the sensor data may be a temperature in a motor vehicle environment, a humidity in the motor vehicle environment, map data and/or historical data.

The image data may be information which has been gathered from one or more images from at least one camera installed on the motor vehicle.

This information may comprise a terrain topology of the motor vehicle surrounding area, an area of vegetation (e.g., edge of a forest, forest, clearing, meadow, etc.) in the motor vehicle surrounding area, a light condition in the motor vehicle surrounding area, the weather in the motor vehicle surrounding area, a current time, a current season, warnings in the motor vehicle surrounding area (e.g., warning signs with indications of possible wildlife occurrence) and/or actual detection of wildlife in the motor vehicle surrounding area, in particular by means of object recognition.

In addition or as an alternative to the camera data, it is conceivable for the NDVI (Normalized Density Vegetation Index) to be used to determine the vegetation in the motor vehicle surrounding area.

It is conceivable for data from further sensors, which comprise, for example, a temperature and/or a humidity in the motor vehicle surrounding area, to be additionally or alternatively used.

Additionally or alternatively, it is possible to use map data comprising information relating to the terrain topology and/or the area of vegetation (e.g., edge of a forest, forest, clearing, meadow, etc., see above) in the motor vehicle surrounding area.

The motor vehicle can be located, for example, with the assistance of GPS (Global Positioning System).

In addition, the method is not limited to data locally stored in the motor vehicle. The above-mentioned historical data, which can comprise, for example, information relating to current detection of wildlife and/or detection of wildlife in the past and/or a collision between wildlife and further vehicles in the motor vehicle environment, can be stored in a backend and can be used as a basis for determining the probability of occurrence of wildlife.

It is also conceivable to additionally or alternatively use information relating to wild animal biology, which comprises, for example, a seasonal behavior and/or activity of wildlife according to the time of day, to determine the probability of occurrence of wildlife. As described above, wild animal biology may be subject to regional differences, which can likewise be taken into account in the method.

The method is distinguished by the fact that the probability of occurrence is determined on the basis of the received image data by means of an artificially intelligent system.

The artificially intelligent system may comprise, for example, an artificial neural network, for example a convolutional neural network (CNN) and/or a Bayesian network.

The use of the artificially intelligent system offers the advantage that it has a statistical model based on training data. The system can therefore also assess unknown data (so-called learning transfer), and the present method is not limited to certain scenarios or data records stored in a database, like the methods for predicting the probability of occurrence of wildlife which are known from the prior art. It is conceivable to use the artificially intelligent system, in particular, to simulate a driver with local knowledge who adapts a speed of the motor vehicle to an increased probability of occurrence of wildlife on the basis of his local knowledge and general driving experience, for example, at certain times, in certain seasons and for certain environmental conditions.

Preferred developments of the method described above are explained below.

The determination of the probability of occurrence by means of the artificially intelligent system may comprise determining a semantic segmentation map on the basis of the image data, determining a depth map on the basis of the image data and/or 3D sensor data, fusing the semantic segmentation map and the depth map in order to thus obtain a semantic segmentation map with depth information, determining vegetation in a motor vehicle surrounding area on the basis of the semantic segmentation map with the depth information, determining the probability of occurrence on the basis of the determined vegetation, determining the probability of occurrence on the basis of the determined terrain. Additionally or alternatively, the determination of the probability of occurrence may also comprise consideration of further available data, for example, weather data or data relating to light conditions. The various determination possibilities can be used individually or in combination (in parallel or sequentially).

This enables direct sensor-based classification of the environment, in particular direct sensor-based determination of the vegetation in the motor vehicle surrounding area (for example, using the NDVI or Normalized Density Vegetation Index already described above). The species distribution and health of the vegetation, for example, and, directly and/or indirectly, the probability of occurrence for the wildlife can be derived therefrom.

Vegetation, which is also referred to as plant cover, can be understood as meaning all the plant information relating to an area of land.

Alternatively or additionally, the determination of the probability of occurrence by means of the artificially intelligent system enables direct sensor-based determination of the terrain in the motor vehicle surrounding area and/or other relevant factors.

The method may comprise outputting a warning signal to a user of the motor vehicle and/or into an environment of the motor vehicle on the basis of the determined probability of occurrence.

Additionally or alternatively, the method may comprise outputting a control signal for influencing lateral and/or longitudinal guidance of the motor vehicle on the basis of the determined probability of occurrence.

In other words and more specifically: in the event of an accordingly high probability of occurrence, which exceeds a predetermined limit value, for example, the driver can be warned by outputting virtual and/or audible information, and/or the speed of the motor vehicle can be adapted automatically, in particular can be limited to a further predetermined limit value, by intervening in the longitudinal guidance of the motor vehicle. In the event of automatic detection of wildlife, for example, by means of camera data, for which the probability of occurrence is virtually 100% (so-called actual detection), the wildlife can be deliberately warned or driven away using an automatic low beam/high beam changeover (so-called flasher) and/or using warning sounds (e.g., horns).

The method may also comprise training the artificially intelligent system before and/or during use of the method during operation of the motor vehicle.

Training before use of the method during operation of the motor vehicle (that is to say before the motor vehicle is sold and operated by a customer/buyer of the motor vehicle) can also be referred to as offline training, and training during the drive or during use of the method during operation of the motor vehicle (that is to say after the motor vehicle has been sold and operated by a customer/buyer of the motor vehicle) can also be referred to as online training. Supervised and/or unsupervised machine learning is conceivable for both types of training.

The artificially intelligent system can be trained before use of the method during operation of the motor vehicle on the basis of first training data. The first training data may comprise sensor data, in particular image data, which were recorded during a test drive by a sensor arrangement, in particular a camera, installed in and/or on a motor vehicle and are optionally linked to a probability of occurrence.

Additionally or alternatively, the artificially intelligent system can be trained during use of the method during operation of the motor vehicle on the basis of second training data. The second training data may comprise sensor data, in particular image data, which were recorded in a situation by the sensor arrangement, in particular a camera, installed in and/or on the motor vehicle, in which wildlife is detected by means of the sensor data, in particular image data, and which are optionally linked to a probability of occurrence.

In other words, a wildlife accident pre-warning system, which carries out the method described above, may have an algorithm which captures the above-mentioned input data and relates the data to a probability of occurrence of wildlife. The correlation between the input data and the probability of occurrence can be initially calculated/trained with the aid of training data using statistical methods (e.g., machine learning). During operation, the system can independently improve by correlating its own sightings of wildlife and/or sightings of wildlife by further/other motor vehicles (so-called swarm intelligence) with the captured input data and thus optimizing the parameters of the algorithm.

A control apparatus is also provided and is distinguished by the fact that it is configured to at least partially carry out the method described above. The control apparatus may be, for example, an electronic control unit (ECU) installed in and/or on the motor vehicle.

The control apparatus may also be referred to as a data processing apparatus and can be connected, in particular wirelessly, to a backend. The control apparatus may be configured to transmit sensor data captured by on-board sensors of the motor vehicle to the backend. The backend may be configured to determine the probability of occurrence in the manner described above and to output it to the control apparatus. The control apparatus may be configured to automatically control lateral and/or longitudinal guidance of the motor vehicle on the basis of the probability of occurrence, in particular received by the backend.

The description given above with respect to the method also similarly applies to the control apparatus and vice versa.

An automated motor vehicle is also provided and is distinguished by the fact that the motor vehicle has the control apparatus described above and a sensor arrangement, in particular a camera, which is installed in and/or on the motor vehicle and is configured to output the sensor data, in particular image data, described above to the control apparatus.

The motor vehicle may be an automobile. The motor vehicle may be an automated automobile.

The automated motor vehicle may be configured to at least partially and/or occasionally undertake lateral and/or longitudinal guidance during automated driving of the motor vehicle.

Automated driving can be carried out in such a manner that the motor vehicle is moved (largely) autonomously.

The motor vehicle may be a motor vehicle of autonomy level 1, that is to say may have certain driver assistance systems which assist the driver when operating the vehicle, for example adaptive cruise control (ACC).

The motor vehicle may be a motor vehicle of autonomy level 2, that is to say may be partially automated such that functions, such as automatic parking, lane keeping or lateral guidance, general longitudinal guidance, acceleration and/or braking, are undertaken by driver assistance systems.

The motor vehicle may be a motor vehicle of autonomy level 3, that is to say conditionally automated such that the driver does not constantly need to monitor the vehicle system. The motor vehicle independently carries out functions such as operating the turn signal, changing lanes and/or lane keeping. The driver can attend to other things but if necessary is prompted by the system to take control within an advance warning time.

The motor vehicle may be a motor vehicle of autonomy level 4, that is to say highly automated such that the vehicle is permanently controlled by the vehicle system. If the driving tasks are no longer managed by the system, the driver may be prompted to take control.

The motor vehicle may be a motor vehicle of autonomy level 5, that is to say fully automated such that the driver is not needed to perform the driving task. Apart from stipulating the destination and starting the system, no human intervention is needed. The motor vehicle can manage without a steering wheel and pedals.

The description given above with respect to the method and the control apparatus also similarly applies to the motor vehicle and vice versa.

A computer program product and a computer-readable storage medium are also provided, each comprising instructions which, when the program is executed by a control apparatus, cause the latter to at least partially carry out the method described above. The description given above with respect to the method, the control apparatus and the motor vehicle similarly also applies in each case to the computer program product and the computer-readable storage medium and vice versa.

An embodiment is described below with reference to FIGS. 1 and 2.

DETAILED DESCRIPTION OF THE DRAWINGS

Figure 1:
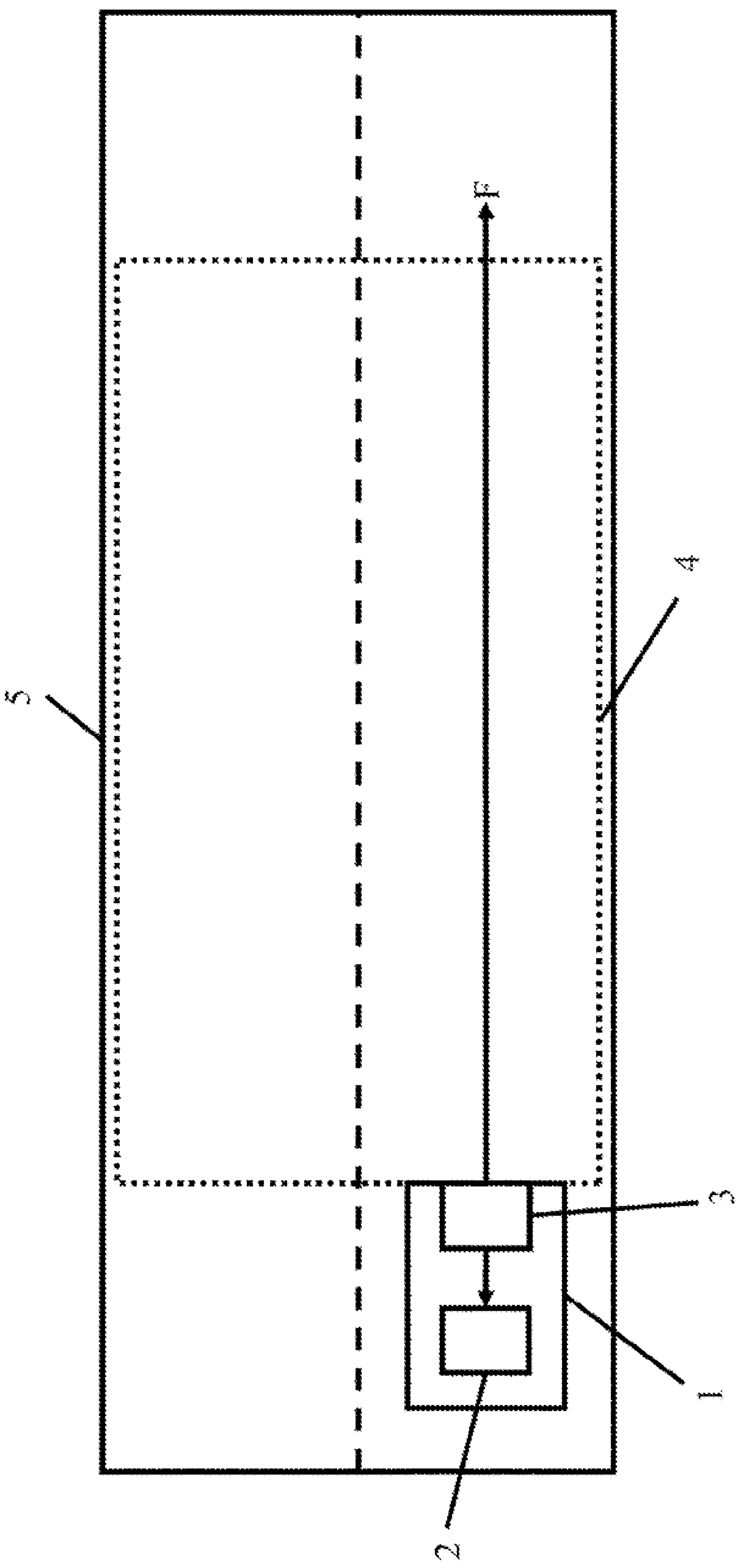
FIG. 1 schematically shows the motor vehicle which carries out a method, the flowchart of which is illustrated in FIG. 2, FIG. 2 schematically shows the flowchart of the computer-implemented method for determining a probability of occurrence of wildlife in a predetermined region in a main direction of travel of an automated motor vehicle, and FIG. 3 schematically shows a flowchart of a third step of the method.

FIG. 1 illustrates a plan view of an automated motor vehicle 1 which is moving on a road 5 in a (main) direction of travel F. The motor vehicle 1 has a control apparatus 2 and a sensor arrangement 3 connected to the control apparatus 2. The sensor arrangement 3 comprises various sensors, for example, a camera in order to visually capture an environment of the motor vehicle 1, and a GPS sensor in order to determine a position of the motor vehicle 1. The sensor data captured by the sensor arrangement 3 are output by the sensor arrangement to the control apparatus 2 which receives the sensor data in order to carry out the computer-implemented method also described below with reference to FIG. 2.

Figure 2:
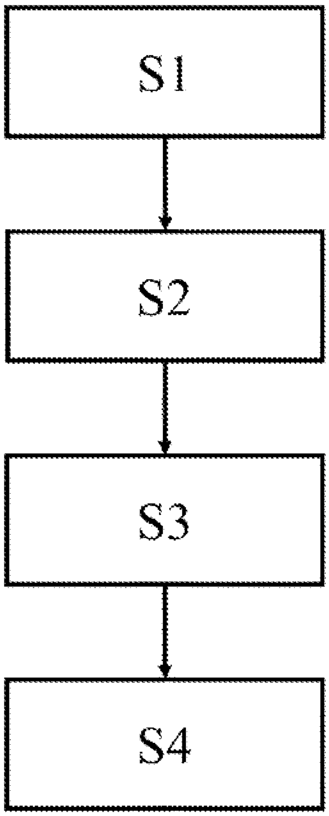

The computer-implemented method, the flowchart of which is illustrated in FIG. 2, is used to determine a probability of occurrence of wildlife in a predetermined region 4 (see FIG. 1) which is in front of the automated motor vehicle 1 in the main direction of travel F.

As can be gathered from FIG. 2, the method comprises substantially four steps S1, S2, S3, S4. The method is at least partially carried out by the control apparatus 2.

In a first step S1 of the method, an artificially intelligent system, which is used in a subsequent step S3 of the method to determine the probability of occurrence, is trained. The artificially intelligent system can be trained, for example, during a development process of the motor vehicle 1, that is to say before it is delivered to a customer.

In other words, in an initial step S1 of the method, the artificially intelligent system is trained before use of the method during operation of the motor vehicle 1. This training in the first step S1 can be carried out by the control apparatus 2. However, it is also conceivable for the artificially intelligent system to be trained in the first step S1 with the aid of an external computing apparatus and for the artificially intelligent system that has already been trained to be loaded onto the control apparatus 2 before use of the method during operation of the motor vehicle 1 (e.g., during assembly/production of the motor vehicle 1).

The artificially intelligent system is trained in the first step S1 of the method on the basis of so-called first training data. These first training data, which can also be referred to as a first training data set, comprise sensor data which were recorded during one or more test drives or trial runs. It is conceivable for a structurally identical motor vehicle or the motor vehicle 1 itself to be used during the test drive or the plurality of test drives. However, the method is not limited to this, and training data which have been collected once can also be used for motor vehicles of other series and therefore across series.

In addition to the recorded sensor data, the training data comprise a respectively corresponding probability of occurrence which was added manually, for example (so-called manually labeled data). The artificially intelligent system can therefore be trained using the first training data and machine learning. The artificially intelligent system learns from the examples included in the training data and can generalize them after the end of the learning phase, that is to say after the first step S1 of the method. For this purpose, algorithms in machine learning construct a statistical model which is based on the first training data. That is to say, the examples are not simply learnt by heart, but rather patterns and regularities are recognized in the first training data. The system can therefore also assess unknown data (so-called learning transfer).

The first step S1 is followed by a second and a third step S2, S3 of the method, which can also be referred to as the method for determining the probability of occurrence in the narrower sense and take place during use of the method during operation of the motor vehicle 1.

In the second step S2 of the method, the control apparatus 2 receives, in the manner described above, sensor data from the sensor arrangement 3 installed in and/or on the motor vehicle.

In the third step S3 of the method, the control apparatus determines the probability of occurrence of wildlife in the predetermined region 4 on the basis of the sensor data received in the second step S2. For this purpose, the control apparatus inputs these sensor data, as input data, into the artificially intelligent system trained in the first step S1 of the method and then determines the probability of occurrence on the basis of the received sensor data by means of the artificially intelligent system.

After determining the probability of occurrence in the third step S3 of the method, a control signal is output from the control apparatus 2 to the motor vehicle 1 in a fourth step S4 of the method on the basis of the probability of occurrence determined in the third step S3 of the method.

Depending on the level of the probability of occurrence, the control signal prompts the motor vehicle 1 to emit or output a warning signal to a user of the motor vehicle, for example, by means of a display installed in the interior of a motor vehicle and/or a loudspeaker system installed in the interior of the motor vehicle, and/or into an environment of the motor vehicle, for example, by means of a light system of the motor vehicle and/or a horn of the motor vehicle.

Additionally or alternatively, the control signal can be used to intervene in or influence lateral and/or longitudinal guidance of the motor vehicle on the basis of the probability of occurrence determined in the third step S3 of the method.

In addition or as an alternative to the training of the artificially intelligent system described above, the method may also comprise training of the artificially intelligent system during use of the method during operation of the motor vehicle 1, for example, during the steps or at least partially simultaneously with steps S2, S3, S4.

The description given above with respect to the first step S1 also similarly applies to the training of the artificially intelligent system during use of the method during operation of the motor vehicle 1. That is to say, the training can be carried out on the basis of so-called second training data, wherein these second training data comprise sensor data which were recorded in a situation by the sensor arrangement 3 installed in and/or on the motor vehicle 1, in which wildlife is detected by means of the sensor data and which are then optionally linked to a probability of occurrence. A predetermined probability value can be used, for example, to link the sensor data to the probability of occurrence.

Figure 3:
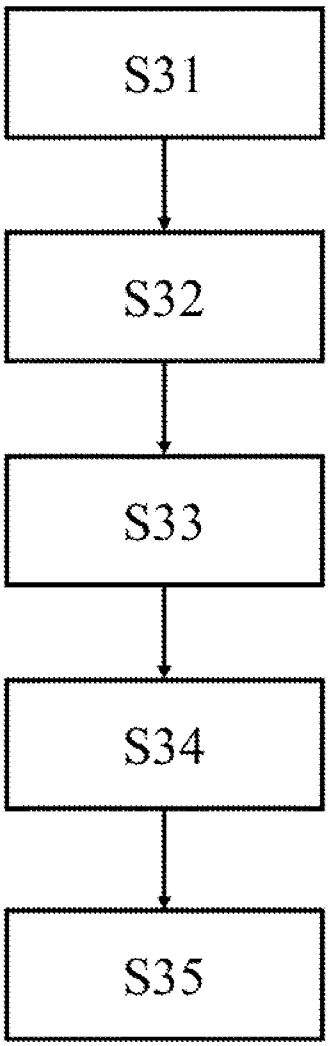

The third step S3 of the method, that is to say determining the probability of occurrence of wildlife in the predetermined region 4 on the basis of the sensor data or camera images or image data received from the camera in the second step S2, is described further in detail below with reference to FIG. 3.

The third step S3 comprises five substeps S31-S35. In a first substep S31, the camera images are semantically segmented into a multiplicity of classes, for example, comprising a class for terrain, water, vegetation, road and/or wildlife crossing area, by means of deep artificial neural networks, in order to thus obtain a semantic segmentation map.

Semantic (image) segmentation is understood as meaning the simultaneous clustering/segmentation of an image into image segments and classification of these image segments into a fixed number of classes. Deep artificial neural networks or deep learning methods are used for this purpose. The problem of semantic segmentation can be formulated as a classification problem for each individual pixel of the image or image data.

In a second substep S32, a depth map is determined, in particular calculated, on the basis of sensor data from 3D sensors, for example, a LiDAR sensor, and/or the camera images using deep learning methods.

A depth map is an image or image data containing information relating to a distance between surfaces of scene objects and a point of view, here of the camera.

In a third substep S33, the semantic segmentation map determined in the first substep S31 is then fused with the depth map determined in the second substep S32, in order to thus obtain a semantic segmentation map with depth information.

In a fourth substep S34, vegetation in the motor vehicle surrounding area is determined on the basis of the semantic segmentation map with depth information determined in the third substep S33. The NDVI (Normalized Density Vegetation Index) or an index based on this can be used for this purpose. Alternatively or additionally, the terrain in the motor vehicle surrounding area can be determined in the fourth substep S34 on the basis of the semantic segmentation map with depth information determined in the third substep S33.

In a fifth substep S35, the probability of occurrence of wildlife is determined on the basis of the vegetation and/or the terrain in the motor vehicle surrounding area, as determined in the fourth substep S34. When determining the probability of occurrence of wildlife, in particular on the basis of the vegetation and/or terrain determined in the fourth substep S34, direct sensor-based detection of wildlife, for example, on the basis of the image data, can also be taken into account. Additionally or alternatively, it is possible to take into account information relating to a time of day, a season, the weather, a humidity, a temperature, a brightness, light conditions, cultivation of the environment and/or forest areas in the environment, in particular in the form of a statistical probability calculation. This information can be at least partially obtained from a database inside and/or outside the motor vehicle.

An artificially intelligent system can also be used, in particular in each case, for the third, the fourth and/or the fifth substep S33-S35.

LIST OF REFERENCE SIGNS

- 1 Motor vehicle
- 2 Control apparatus
- 3 Sensor arrangement
- 4 Predetermined region
- 5 Road
- F Main direction of travel of the motor vehicle
- S1-S4 Steps of the method
- S31-S35 Substeps of the third step of the method

What is claimed is:

1. A computer-implemented method for determining a probability of occurrence of wildlife in a predetermined region in a main direction of travel of an automated motor vehicle, the method comprising:

receiving image data from a sensor arrangement installed in and/or on the motor vehicle, and determining, by an artificially intelligent system, the probability of occurrence based on the received image data, including:

determining a semantic segmentation map based on the image data;

determining a depth map based on the image data and/or 3D sensor data;

fusing the semantic segmentation map and the depth map in order to thus obtain a semantic segmentation map with depth information;

determining vegetation and/or a terrain in a motor vehicle surrounding area based on the semantic segmentation map with the depth information; and determining the probability of occurrence based on the determined vegetation and/or the determined terrain.

2. The computer-implemented method according to claim 1, further comprising outputting a warning signal to a user of the motor vehicle and/or into an environment of the motor vehicle based on the determined probability of occurrence.

3. The computer-implemented method according to claim 2, further comprising outputting a control signal for influencing lateral and/or longitudinal guidance of the motor vehicle based on the determined probability of occurrence.

4. The computer-implemented method according to claim 2, further comprising training the artificially intelligent system before and/or during use of the method during operation of the motor vehicle.

5. The computer-implemented method according to claim 1, further comprising outputting a control signal for influencing lateral and/or longitudinal guidance of the motor vehicle based on the determined probability of occurrence.

6. The computer-implemented method according to claim 5, further comprising training the artificially intelligent system before and/or during use of the method during operation of the motor vehicle.

7. The computer-implemented method according to claim 5, wherein the artificially intelligent system is trained before use of the method during operation of the motor vehicle based on first training data comprising image data which were recorded during a test drive by a camera installed in and/or on a motor vehicle and are optionally linked to a probability of occurrence.

8. The computer-implemented method according to claim 7, wherein the artificially intelligent system is trained during use of the method during operation of the motor vehicle based on second training data comprising image data which were recorded in a situation by the camera installed in and/or on the motor vehicle, in which the wildlife is detected via the image data and which are optionally linked to a probability of occurrence.

9. The computer-implemented method according to claim 1, further comprising training the artificially intelligent system before and/or during use of the method during operation of the motor vehicle.

10. A control apparatus configured to carry out a method according to claim 1.

11. An automated motor vehicle including the control apparatus according to claim 10 and a camera which is installed in and/or on the motor vehicle and is configured to output image data to the control apparatus.

12. A non-transitory computer-readable storage medium comprising instructions which, when executed by a control apparatus, cause the control apparatus to carry out a method according to claim 1.

* * * * *